Figure 1:
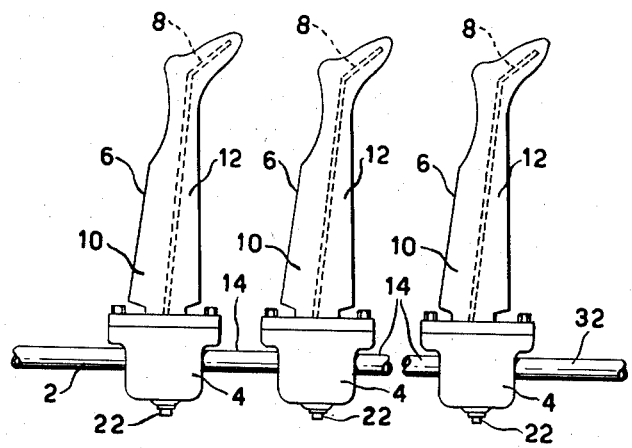

Oct. 2, 1951     J. SELIGMAN     2,569,735

STEAM CIRCULATOR

Filed Oct. 7, 1948

INVENTOR.
JOSEPH SELIGMAN
BY

ATTORNEYS

Patented Oct. 2, 1951

2,569,735

UNITED STATES PATENT OFFICE 2,569,735

STEAM CIRCULATOR

Joseph Seligman, Philadelphia, Pa., assignor to Philadelphia Metal Drying Form Company, Inc., Philadelphia, Pa., a corporation of Pennsylvania Application October 7, 1948, Serial No. 53,301

2 Claims. (Cl. 257—254)

The present invention relates to an improved steam circulating system for heating or drying units such as are particularly adapted for use with hosiery and other similar driers.

The invention relates more particularly to drying apparatus in which the drying forms are connected in series so that steam is caused to flow successively through the forms in its passage through the series. Considerable difficulty has been experienced in the operation of such apparatus owing to the choking or clogging caused by trapping of air, condensate water and scale or other solid matter in the restricted circulatory channels of the comparatively thin forms thereby preventing the passage of the steam.

In the prior art there exist various devices for providing a bypass for the flow of steam in the event that one of the series of drying forms should become clogged. These various devices all represent modifications of a trap type water seal. In order to prevent premature blow-by these traps must be quite deep. As a result they create considerable pressure drop when it is necessary for the steam to blow through the trap in the event the accompanying form has become clogged. If the space below the separator at the bottom of the trap is made small to resist blow-by, the pressure drop across the bypass increases, and further, the trap is more susceptible to clogging due to the normal accumulation of scale and dirt.

If the space below the separator at the bottom of the trap is made large and the trap is made proportionately deeper, it naturally follows that a larger water content will be required to seal the trap thereby increasing the period of time required to fill and seal the trap thereby delaying the heating of the accompanying drying form. If the space below the separator at the bottom of the trap is made large and the trap is made shallow, then the trap is susceptible to premature blow-by which allows a part of the steam flow to bypass the drying form thereby lowering the temperature of the form and giving rise to erratic drying rates among the various forms.

An object of the invention is to provide a circulator avoiding the undesirable characteristics as indicated above. The present invention provides a circulator offering relatively high resistance to premature blow-by and relatively low steam pressure drop on continuous blow-by.

Another object of the invention is to provide a circulator having variable capacity for bypassing condensate water past the drying form.

The invention further provides a circulator which is not susceptible to clogging by a normal accumulation of scale and dirt and yet which may readily be cleaned by the removal of an accessible clean-out plug.

Figure 2:
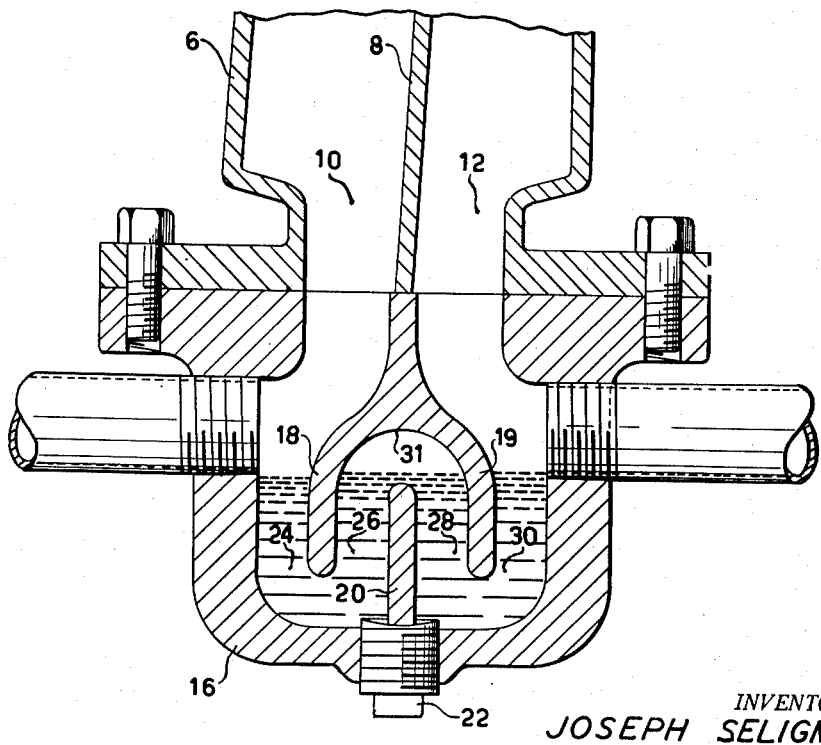

These and other objects particularly relating to details of construction and operation of the invention will become apparent from the following description read in conjunction with the accompanying drawings in which:

Figure 1 is an elevation of a series of drying forms employing the present steam circulator; and Figure 2 is an enlarged section of the circulator showing the details of construction.

Steam through pipe line 2 is fed successively through a series of circulators 4 to which are attached drying forms 6. Within each drying form is a separator 8 causing the steam to flow upward through chamber 10 and downward through chamber 12 through intermediate pipe section 14 into the next successive drying form.

The steam circulator consists of a bowl portion 16 having therein separators 18, 19 and 20. Into the base of the bowl is screwed a plug 22. Thus, the bypass route through the circulator is defined by passages 24, 26, 28 and 30.

During normal operation of the circulator, condensate water draining from the various drying forms passes through intermediate pipe sections 14 and circulates through the passages 24, 26, 28 and 30 in the circulator and passes off with the unused steam through pipe line 32. The entire assembly consisting of a series of steam circulators and drying forms may be mounted on a slight incline raising the inlet end pipe 2 slightly above the outlet end pipe 32 to encourage the discharge flow of water by the action of gravity.

It will be noted that the present circulator provides passages 24, 26, 28 and 30 in parallel with the path formed by passages 10 and 12 through the drying form. In the event that a pressure surge of short duration should occur in the system, water from the passages 24—26 will blow over into passages 28—30 and water from passages 28—30 will blow out of the circulator but the water seal will not be broken, therefore, the steam circulation through the drying form will be uninterrupted. Yet, in the event of an extended surge or of a clogged form, the pressure drop across the circulator required to keep the circulator open is quite small because of the low height of the columns of water within the passages. By utilization of the construction of the present invention a pressure drop in the order of one-tenth of a pound is imposed on the steam flow by the circulator in the event that the accompanying form becomes clogged, whereas in the devices in the prior art, pressure drops are from five to ten times this value. However, due to the novel construction of the present circulator, the resistance to premature blow-by is generally similar to that of a conventional trap offering many times the steam pressure drop on continuous blow-by.

An additional feature of operation existing in the present invention is the air cushion trapped under the dome 31 formed by the joining of separators 18 and 19. This air cushion forms a resilient head or separator between the volumes of water lying in the passages. This cushion serves to flatten the peaks of pressure surges acting on the water in the downstream trap formed by passages 28 and 30 thereby further reducing the frequency of the occurrence of the breaking of the water seal resulting in allowing the steam to bypass the drying form until the passages refill with condensation water.

In the operation of a bank of drying forms it is of utmost importance that the temperature of the forms be consistently steady and uniform. Circulators susceptible to premature blow-by are most destructive to these conditions of uniformity, and circulators offering excessive pressure drop when called upon to provide a continuous blow-by, such as when the adjacent form becomes clogged, disturb the temperature balance of the entire system. The present circulator is specifically designed to minimize these undesirable conditions.

It will be further noted that the clean-out plug which is screwed into the base of the circulator bowl 16 contacts separator 20 thus effectively sealing off any flow of water below separator 20. Scale and other sediment collecting in the bottom of the bowl 16 may settle in an area extending over the entire base of the bowl, thus, a large area for sediment collection is provided. This area for sediment collection is considerably greater than that provided by any of the circulators existing heretofore. Upon removal of the clean-out plug, scale and dirt lying in the base of the bowl may be readily removed.

The clean-out plug is also used to serve another purpose. It is obvious that when a series of drying forms are in operation the circulators associated with the drying forms at the down stream or outlet end of the series will be required to pass much more condensate water than the circulators at the upstream or inlet end. The danger in overloading the condensate bypass capacity of the circulator lies in the possibility of piling up condensate water ahead of the trap resulting in carrying condensate water up into the drying form. This leads to various undesirable operating conditions such as unbalanced drying and shocks or surges in the system.

It is possible to greatly increase the capacity of the present trap to bypass condensate water by simply backing out the drain plug 22 thereby providing a space between separator 20 and the end of the plug. Stated differently, it is possible to provide an additional path between separators 20 and 22 for the flow of water thus reducing the resistance afforded by the circulator to the flow of condensate water therethrough. Therefore, the operating range, measured in terms of volume of condensate being bypassed, over which this trap will operate is much greater than that found in the conventional type trap employed heretofore.

What I claim and desire to protect by Letters Patent is:

1. A steam circulator adapted for use in a steam drying apparatus including a series of steam circulators joined by connecting lines and each having a drying form mounted thereon, said steam circulator comprising a chamber the walls of which contain a bore for the admission of a steam supply, a bore for the discharge of steam exhaust, a bore providing steam supply into the drying form mounted thereon and a bore allowing steam return out of the drying form, a central baffle extending upward from the bottom of the chamber, and an inverted U-shaped baffle extending from between the bores serving the drying form on the top of the chamber downward on either side of the central baffle, said central baffle and said U-shaped baffle extending transversely of the chamber between the steam supply port and the steam discharge port, said inverted U-shaped baffle forming a domed chamber for retaining trapped air, said central baffle, said U-shaped baffle and the sides of the chamber forming walls of passages providing a double seal bypass past the drying form through which condensate water passes flowing from the steam supply port to the steam discharge port.

2. A steam circulator adapted for use in a steam drying apparatus including a series of steam circulators joined by connecting lines and each having a drying form mounted thereon, said steam circulator comprising a chamber the walls of which contain a bore for the admission of a steam supply, a bore for the discharge of steam exhaust, a bore providing steam supply into the drying form mounted thereon and a bore allowing steam return out of the drying form, a central baffle extending upward from the bottom of the chamber, an inverted U-shaped baffle extending from between the bores serving the drying form on the top of the chamber downward on either side of the central baffle, said central baffle and said U-shaped baffle extending transversely of the chamber between the steam supply port and the steam discharge port, said inverted U-shaped baffle forming a domed chamber for retaining trapped air, said central baffle, said U-shaped baffle and the sides of the chamber forming walls of passages providing a double seal bypass past the drying form through which condensate water passes flowing from the steam supply port to the steam discharge port, and a removable plug passing through the bottom wall of said chamber and engaging a lower edge of said central baffle for providing a drain plug for the circulator.

JOSEPH SELIGMAN.

REFERENCES CITED

The following references are of record in the file of this patent:

UNITED STATES PATENTS

| Number | Name | Date |
| --- | --- | --- |
| 179,027 | Kelly | June 20, 1876 |
| 677,876 | Martin | July 9, 1901 |
| 917,813 | Thomas | Apr. 13, 1909 |
| 919,110 | Zeck | Apr. 20, 1909 |
| 1,303,573 | Morton | May 13, 1919 |
| 1,344,612 | Bickel | June 29, 1920 |
| 1,604,397 | Ercanback | Oct. 26, 1926 |